Figure 1:
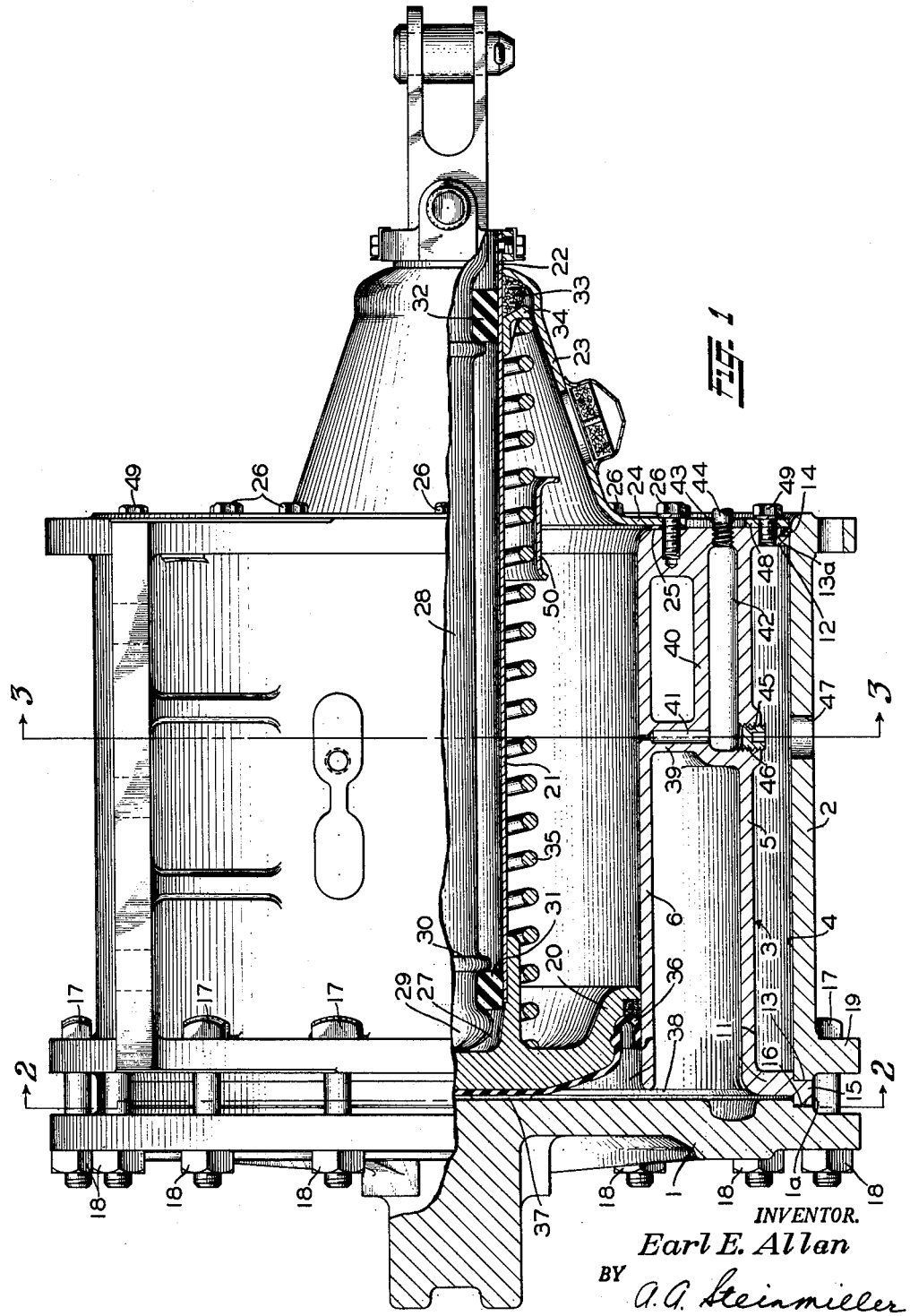

INVENTOR.
Earl E. Allan
BY
A. G. Steinmiller
Attorney

Oct. 13, 1964     E. E. ALLAN     3,152,516

CONVERSION BRAKE CYLINDER

Filed July 30, 1962     2 Sheets-Sheet 2

INVENTOR.
Earl E. Allan
BY
*A. G. Steinmiller*
Attorney 3,152,516
CONVERSION BRAKE CYLINDER
Earl E. Allan, Monroe Heights, Pitcairn, Pa., assignor to Westinghouse Air Brake Company, Wilmerding, Pa., a corporation of Pennsylvania
Filed July 30, 1962, Ser. No. 213,255
6 Claims. (Cl. 91—189)

This invention relates to brake cylinder devices and, more particularly, to means for readily and inexpensively converting existing brake cylinder devices whereby to enable the use of molded brake shoes with existing railway braking equipment in place of customary cast iron brake shoes.

The molded type of brake shoe, as referred to herein, may consist of a composition material that includes, for example, cast iron chips molded with a binding medium comprising rubber and a resin. A composition suitable for use as a molded type brake shoe is disclosed, for example, in United States Patent No. 2,686,140, issued to C. L. E. DeGaugue, Jr., on August 10, 1954. The molded type brake shoes have a much higher coefficient of friction than cast iron type shoes and retain almost a constant coefficient of friction over a wide range of speed thereby requiring less brake shoe pressure to effect the same degree of braking on the wheels of a railway car.

Tests conducted with the molded type brake shoes show that, for obtaining substantially corresponding braking effect, approximately one-fourth of the actuating force is required for the molded type brake shoes as is required for the cast iron type brake shoe commonly used on the American railroads at the present time. Such tests indicate that the actuating force delivered by the present existing brake cylinders and brake rigging is far in excess of what is necessary for the molded type of brake shoes. Simply using less fluid pressure or reducing the size of the brake cylinder to reduce the braking force will introduce complications because of pressure equalization problems incident to the use with existing fluid pressure brake control valve devices. Moreover, modification or complete replacement of existing brake control equipment and brake rigging on railway cars, to conform to the requirements of the molded type of brake shoe, would be very costly and economically would not warrant the change-over to molded brake shoes in many instances.

Accordingly, it is an object of this invention to provide a simple and relatively inexpensive device for effecting a conversion of existing brake cylinders so as to adapt these existing brake cylinders to deliver the proper amount of actuating force to the molded type of brake shoe without interfering with the proper operation of the existing pneumatic brake control equipment presently on the car.

In Patent 2,880,043, issued March 31, 1959, to William C. Landis, and assigned to the assignee of this application, there is disclosed and claimed a conversion element for use with existing brake cylinder devices. However, the conversion element disclosed in the Landis patent is provided with no means for connection with a slack adjusted device which in actual practice is usually used with a brake cylinder device on a railway car to compensate for the slack occurring as a result of wear of the various parts of the brake rigging. According to this invention, a novel conversion element represents an improvement over the conversion element described in the Landis Patent No. 2,880,043 and includes therein a fluid pressure passageway open at one end into a bore in which is slidably mounted a brake cylinder piston at such a location as to be uncovered by the brake cylinder piston upon the stroke of the piston exceeding its normal value. The opposite end of the passageway in the novel conversion element opens to the exterior thereof and is threaded to receive one end of a pipe, the opposite end of which may be connected to the usual slack adjuster device.

More particularly, according to the present invention, the body of the usual brake cylinder device found on railway cars is provided with a conversion element having at one end a flange which is disposed between one end of the brake cylinder body and the usual pressure head of the brake cylinder. The pressure head is secured to a flange now present on the brake cylinder body by a plurality of bolts and nuts, the length of which bolts exceed the length of bolts presently used by the thickness of the flange on the one end of the conversion element. The conversion element is provided with a brake cylinder piston, the diameter of which is less than that of the piston previously used. The piston and the conversion element cooperate with the pressure head to form a volume chamber that is substantially the same size as the volume chamber provided by the larger diameter piston previously used with the brake cylinder body. Therefore, the ratio that exists between the pressure established in the brake cylinder, by flow of fluid under pressure from the usual auxiliary reservoir under the control of the triple valve device, such as the well-known AB valve device, and the amount of reduction effected from the normal pressure carried in the usual brake pipe remains substantially the same. The conversion element further includes a passageway therein through which fluid under pressure is supplied for the operation of a slack adjuster mechanism upon the piston travel exceeding its normal value.

In the accompanying drawings:

FIG. 1 is a partial sectional view in elevation of a brake cylinder device embodying the novel conversion element of the present invention.

Figure 3:
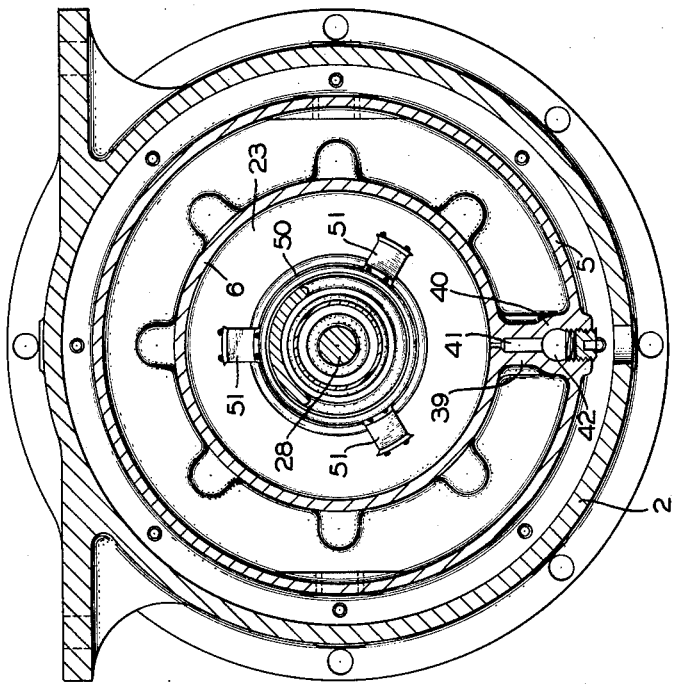
Figure 2:
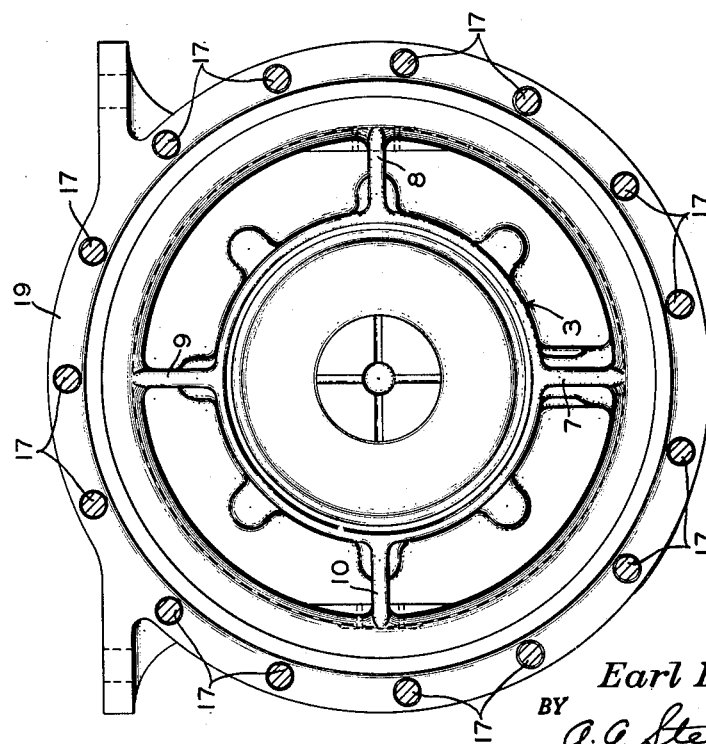

FIG. 2 is a vertical cross-sectional view, taken along the line 2—2 of FIG. 1 and looking in the direction of the arrows, showing details of construction of a flange that is formed at that end of the conversion element that is adjacent to the pressure head of the brake cylinder; and FIG. 3 is a horizontal cross-sectional view, taken along the line 3—3 of FIG. 1, and looking in the direction of the arrows, showing details of the passageway provided in the conversion element through which fluid under pressure may be supplied to a slack adjuster mechanism.

*Description*

As shown in the drawings, a brake cylinder device embodying the invention comprises the usual pressure head 1 and brake cylinder body 2 but differs from conventional brake cylinders in having a hollow cylindrical conversion element 3 disposed in the usual bore 4 in the brake cylinder body 2. The cylindrical conversion element 3 comprises an outer sleeve 5 and an inner sleeve 6 coaxial therewith and connected thereto at the left-hand end thereof by four radial webs. The four webs at the left-hand end of the conversion element 3, as viewed in FIG. 1, are indicated in FIG. 2 by numerals 7, 8, 9 and 10. The right-hand end of the outer sleeve 5 is connected to the right-hand end of the inner sleeve 6 by a ring that is cast integral with the outer and inner sleeves. As shown in FIG. 1, the outer sleeve 5 is provided at its respective left and right-hand ends with annular flanges 11 and 12. The right-hand side of the annular flange 11 has a cut-back or offset surface 13 machined thereon which, as shown in FIG. 1, rests against the left-hand end of the brake cylinder body 2. The right-hand side of the annular flange 12 is provided with a similar cut-back or offset surface 13a in which is disposed an O-ring seal 14, the outer periphery of which cooperates with the right-hand end of the bore 4 in brake cylinder body 2 to form a seal to prevent the entrance of dirt, water and dust into the right-hand end of the cylinder body 2.

As shown in FIG. 1, the left-hand side of the flange 11 is provided with an outer ring 15 against which rests an annular gasket seal 16, the outer and inner diameter of which are the same as that of the ring 15. The annular gasket seal 16 is clamped between the outer ring 15 and a cut-back or offset portion 1a formed on the pressure head 1 by a plurality of bolts 17 and nuts 18. The bolts 17 extend through the holes that are presently in a flange 19 formed on the left-hand end of the brake cylinder body 2 and corresponding holes presently in the pressure head 1. These bolts 17 are somewhat longer than the bolts previously used to clamp the pressure head 1 to the flange 19 to compensate for the thickness of the outer ring 15 that is provided on the flange 11 that is disposed between the pressure head 1 and the left-hand end of the brake cylinder body 2.

The inner sleeve 6 has slidably mounted therein a piston 20. A hollow rod 21 secured coaxially to the piston 20 extends slidably through a central opening or bore 22 in a non-pressure head 23. The non-pressure head 23 is provided with a flange 24 at its left-hand end as viewed in FIG. 1. An annular gasket seal 25 is interposed between the left-hand face of the flange 24 and the right-hand side of the flange 12 formed on the right-hand end of the cylindrical conversion element 3. The non-pressure head 23 is secured to the right-hand end of the cylindrical conversion element 3 by a plurality of cap screws 26 which extend through corresponding and coaxial holes or bores in the flange 24 and the annular gasket seal 25 and have screw-threaded engagement with coaxial threaded counterbores in the right-hand end of the cylindrical conversion element 3.

The piston 20 is provided with a recess 27 that is coaxial with the piston. This recess 27 is adapted to receive one end of a piston rod 28. The left-hand end of the piston rod 28 is provided with a knob 29 having a spherical outer surface that is disposed in the recess 27 in the piston 20 and rests against the left-hand end thereof. Disposed between the knob 29 and a rib 30 formed on the piston rod 28 and arranged coaxially about the piston rod 28 is an annular cushioning element 31 which is constructed of rubber or some other suitable material. The piston rod 28 also carries thereon a piston rod sealing ring 32 that is disposed adjacent the exterior end of the hollow rod 21.

A hollow rod packing seal 33 is disposed about the piston rod 28 and between the right-hand end of the non-pressure head 23 and a spring seat 34 also disposed about the hollow rod 21. One end of a brake cylinder release spring 35 rests against the spring seat 34 and the opposite end of this spring rests against the right-hand side of the piston 20.

Formed on a packing cup 36 secured to the piston 20 are a plurality of lugs 37 which, when the piston 20 occupies the position in which it is shown in FIG. 1, contact the right-hand side of the pressure head 1 to form between the pressure head 1 and the piston 20 a pressure chamber 38 to which fluid under pressure may be supplied through a passageway in the pressure head 1.

As shown in FIGS. 1 and 3, the outer sleeve 5 intermediate its opposite ends is connected to the inner sleeve 6 by a web 39. As shown in FIG. 1, extending from the lower end of the web 39 and on the inside of the outer sleeve 5 is a web 40, one end of which is integral with the web 39 and the opposite end is integral with the flange 12. As shown in FIG. 3, the web 39 is provided with a passageway 41, the upper end of which opens into the interior of the inner sleeve 6 and the lower end of which opens into a horizontal passageway 42 extending through the web 40 to the flange 12. The flange 12 is provided with a threaded bore 43 extending from the right-hand face of the flange to the passageway 42. The threaded bore 43 is adapted to receive one threaded end of a pipe 44 that may have the opposite end thereof connected to a slack adjuster mechanism (not shown). As shown in FIG. 1, the outer sleeve 5 is provided with an opening or bore 45 opening into the passageway 42. Bore 45 is screw-threaded to receive a threaded plug 46. Coaxial with the threaded bore 45 is a bore 47 formed in the brake cylinder body 2 by a drilling operation, it being understood that this bore 47 is not in the brake cylinder bodies presently in use on railway cars and is drilled therein at the time of conversion of the brake cylinder body by placing therein cylindrical conversion element 3. The plug 46 may be removed and a threaded end of a pipe that extends through the bore 47 screwed into the threaded bore 45. The opposite end of this pipe may be connected to the slack adjuster mechanism on those cars where it is more convenient to connect the slack adjuster to the brake cylinder in this fashion than by means of the pipe 44 hereinbefore described. Consequently, the arrangement disclosed provides an option, depending upon circumstances, as to which of two locations is selected to make the connection of the pipe leading to the slack adjuster.

The hereinbefore-mentioned O-ring seal 14 is held in place by an annulus 48 secured to the flange 12 by a plurality of cap screws 49 that extend through bores in the annulus 48 and have screw-threaded engagement with corresponding threaded coaxial bores in the flange 12.

In order to maintain the intermediate portion of spring 35 in substantial concentric relation with the hollow rod 21 and thus prevent the spring 35 from sagging or buckling into contact with the hollow rod and causing damage to the same, there is provided a sleeve 50 which encircles the spring and which has an inside diameter slightly greater than the outside diameter of the spring to allow free movement of the spring through the sleeve. The sleeve 50 is held in place by three radially arranged metallic strips 51 shown in FIG. 3 of the drawing, one end of each being welded to the sleeve 50 and the opposite end welded to the interior of the non-pressure head 23.

It will be noted that by providing the brake cylinder device now on a railway car with cylindrical conversion element 3, a smaller internal diameter of the cylinder device is thus obtained and the piston 20 used in the cylindrical conversion element 3 is accordingly smaller than the piston previously used in the brake cylinder body 2. Therefore, the force exerted by the piston 20 on the brake shoes (not shown) as compared to the force exerted by the old-type piston is reduced without substantially reducing the equalizing volume of the brake cylinder device, because the volume of chamber 38, along with the volume to the left of the piston 20 and between the sleeves 5 and 6, as the piston 20 moves in the direction of the right hand to its application position, provides a volume in the modified brake cylinder device that is substantially equivalent to the volume of the old brake cylinder device. By thus retaining substantially the same cylinder volume, it is possible to retain on the railway car the same auxiliary reservoir and associated fluid pressure operated devices for effecting the supply of fluid under pressure from the auxiliary reservoir to the modified brake cylinder to obtain the desired reduced braking force on the wheels of the car.

Having now described the invention, what I claim as new and desire to secure by Letters Patent is:

1. A conversion brake cylinder device comprising:
   (a) a brake cylinder body having a bore extending therethrough and an out-turned flange at one end,
   (b) a pressure head,
   (c) a hollow cylindrical conversion element, the outer diameter of which is smaller than said bore, having at one end an annular out-turned flange, said element being coaxially supported in spaced relation to and within the bore of said brake cylinder body with the annular out-turned flange disposed between the corresponding end of said brake cylinder body and said pressure head,
   (d) common means securing said pressure head to the flange at the one end of said brake cylinder body with the said out-turned flange of said hollow cylindrical conversion element being rigidly held therebetween,
   (e) a non-pressure head,
   (f) means securing said non-pressure head to the end of said hollow cylindrical conversion element opposite the end having said out-turned flange,
   (g) a piston operable in said hollow cylindrical conversion element and subject to fluid under pressure supplied to the chamber at the end of said brake cylinder body closed by said pressure head, and
   (h) said hollow cylindrical conversion element having therein a passageway opening at one end into the interior thereof at a distance from said pressure head that is in excess of the normal travel of said piston, and opening at the opposite end exteriorly of said hollow cylindrical conversion element, via which passageway fluid pressure supplied to the chamber at the end of said body and thus to the interior of said hollow cylindrical conversion element may be delivered exteriorly of the brake cylinder device for a desired purpose upon the travel of said piston past the opening of said passageway at the interior of said hollow cylindrical conversion element.

2. A conversion brake cylinder device, as claimed in claim 1, further characterized in that said hollow cylindrical conversion element comprises two concentric cylindrical sleeve portions integrally connected at the end thereof to which said non-pressure head is secured by an imperforate annulus and open at the opposite end to a pressure chamber formed between said piston and said pressure head, thereby forming between said concentric sleeve portions a chamber that provides brake cylinder volume additional to the volume in the interior of the inner of said two concentric sleeve portions.

3. A conversion brake cylinder device comprising:
   (a) a brake cylinder body having a bore extending therethrough and an out-turned flange at each end,
   (b) a pressure head,
   (c) a hollow cylindrical conversion element, the outer diameter of which is smaller than said bore, having at each end an out-turned flange for coaxially supporting said hollow cylindrical conversion element in spaced relation to and within the bore of said brake cylinder body,
   (d) common securing means securing said pressure head to the out-turned flange at the adjacent end of said brake cylinder body with the out-turned flange at the corresponding end of said hollow cylindrical conversion element being rigidly held therebetween,
   (e) a non-pressure head,
   (f) means securing said non-pressure head to the other end of said hollow cylindrical conversion element,
   (g) a piston operable in said hollow cylindrical conversion element and subject to fluid under pressure supplied to the end of said brake cylinder body closed by said pressure head,
   (h) said hollow cylindrical conversion element having therein a passageway open at one end at the end thereof adjacent said non-pressure head, open at the other end to the interior of said hollow cylindrical conversion element at a distance from said pressure head that is in excess of a certain normal travel of said piston, and open intermediate the ends of said hollow cylindrical conversion element to the exterior thereof,
   (i) said brake cylinder body having, in addition to the bore extending therethrough, an opening in alignment with the opening in said passageway in said hollow cylindrical conversion element that is intermediate its ends and open to the exterior thereof whereby a conduit may be selectively connected to said hollow cylindrical conversion element either at said one end or intermediate the ends thereof for the supply of fluid under pressure from the interior of said hollow cylindrical conversion element to the exterior of said brake cylinder device for a desired purpose when the travel of said piston exceeds a certain normal travel, and
   (j) means for closing that one of the two external openings of said passageway in said hollow cylindrical conversion element to which the conduit is not connected.

4. A conversion brake cylinder device, as claimed in claim 3, further characterized in that the out-turned flange at the end of said hollow cylindrical conversion element to which said non-pressure head is secured is provided with an O-ring that forms a seal with the wall surface of the bore in said brake cylinder body to prevent the entrance of contaminants into the interior of said brake cylinder body.

5. A hollow cylindrical conversion element for use with existing brake cylinder devices of the type comprising a hollow cylindrical body portion having an annular out-turned flange at each end to which is respectively coaxially secured a pressure head and a non-pressure head, said hollow cylindrical conversion element comprising:
   (a) two concentric cylindrical sleeve portions corresponding substantially in length to the length of the hollow cylindrical body portion of an existing brake cylinder device and being coaxially disposed therein,
   (b) an imperforate annulus connecting one end of the inner sleeve portion with the corresponding end of the outer sleeve portion and supporting them in concentric spaced relation to each other, said annulus cooperating with said two concentric cylindrical sleeve portions to form therebetween a chamber that is open at the end opposite said annulus, and
   (c) an out-turned flange formed integral with the outer sleeve portion at the end thereof opposite said imperforate annulus by which out-turned flange the hollow cylindrical conversion element may be mounted concentrically within the hollow cylindrical body of an existing brake cylinder device by being rigidly held between the pressure head and the annular out-turned flange at the corresponding end of the hollow cylindrical body of the existing brake cylinder device, thereby enabling the use of a smaller than standard size of piston conforming in diameter to the bore of the inner sleeve portion without a substantial change in the brake cylinder pressure chamber volume due to opening thereinto of the chamber formed between the inner and outer sleeve portions.

6. A hollow cylindrical conversion element, as claimed in claim 5, further characterized in that said inner and outer cylindrical sleeve portions are connected by a rib having therein a passageway open at one end to the exterior face of said annulus, open at the other end to the interior of said inner sleeve portion at a distance from the pressure head that is in excess of a certain normal piston travel, and open intermediate the ends thereof to the exterior of the outer of said two concentric sleeve portions, whereby a conduit may be selectively connected to said conversion element either at the exterior face of said annulus or at the exterior of the outer of said two concentric sleeve portions through which conduit fluid under pressure may be delivered exteriorly of the existing brake cylinder device for a desired purpose.

References Cited in the file of this patent

UNITED STATES PATENTS

| | | |
|---|---|---|
| 2,597,917 | Bent | May 27, 1952 |
| 2,696,830 | Cameron et al. | Dec. 14, 1954 |
| 2,747,700 | Daly | May 29, 1956 |
| 2,752,012 | Moorhead | June 26, 1956 |
| 2,869,514 | Gluss | Jan. 20, 1959 |
| 2,875,864 | Kirk | Mar. 3, 1959 |
| 2,880,043 | Landis | Mar. 31, 1959 |